United States Patent [19]

Ehmke et al.

[11] Patent Number: 4,579,263
[45] Date of Patent: Apr. 1, 1986

[54] GUN RACK

[75] Inventors: James K. Ehmke; Joseph J. Krueger, both of Milwaukee, Wis.

[73] Assignee: City of Milwaukee, Milwaukee, Wis.

[21] Appl. No.: 639,074

[22] Filed: Aug. 9, 1984

[51] Int. Cl.⁴ .............................................. B60R 7/08
[52] U.S. Cl. ........................... 224/42.42; 224/42.45 R; 224/275; 224/913
[58] Field of Search ........... 211/64; 224/273, 42.45 R, 224/913, 311, 275, 42.43, 42.42, 42.44

[56] References Cited

U.S. PATENT DOCUMENTS

| | | |
|---|---|---|
| 2,287,805 | 6/1942 | Johnson ................................ 211/64 |
| 2,616,566 | 11/1952 | Levy . |
| 2,623,639 | 12/1952 | Levy . |
| 2,692,069 | 10/1954 | Winters et al. . |
| 2,710,100 | 6/1955 | Vermillion . |
| 2,752,046 | 6/1956 | Levy . |
| 2,775,351 | 12/1956 | Johnson et al. . |
| 2,958,422 | 11/1960 | Caloiero et al. . |
| 3,326,385 | 6/1967 | Pinkerton et al. . |
| 3,473,673 | 10/1969 | Porter . |
| 3,477,586 | 11/1969 | Haluska ................................ 211/64 |
| 3,497,077 | 2/1970 | Sjostrand . |
| 3,643,811 | 2/1972 | Howerton . |
| 3,767,094 | 10/1973 | Sikes . |
| 3,802,612 | 4/1974 | Smith .................................... 224/273 |
| 3,917,071 | 11/1975 | Walters . |
| 3,942,691 | 3/1976 | Sisak ..................................... 224/275 |
| 4,132,315 | 1/1979 | Young . |
| 4,159,588 | 7/1979 | Pfeiffer ............................. 211/64 X |
| 4,226,399 | 10/1980 | Henderson ......................... 211/64 X |
| 4,364,499 | 12/1982 | McCue . |

FOREIGN PATENT DOCUMENTS 0036478 9/1981 European Pat. Off. ............ 224/275

Primary Examiner—Stephen Marcus
Assistant Examiner—Robert Petrik

[57] ABSTRACT

A gun rack adapted to be mounted in a vehicle having a rear seat, a floor, and spaced apart front seats, the gun rack being adapted to hold a weapon having a barrel and a stock, the gun rack comprising a base portion adapted to have the weapon fixedly secured thereto, the base portion being mounted on the floor of the vehicle such that, when the weapon is secured to the base portion, the weapon is held in a generally horizontal position along the floor of the vehicle between the front seats with the stock extending rearwardly of the front seats and with the barrel extending forwardly of the front seats.

3 Claims, 4 Drawing Figures

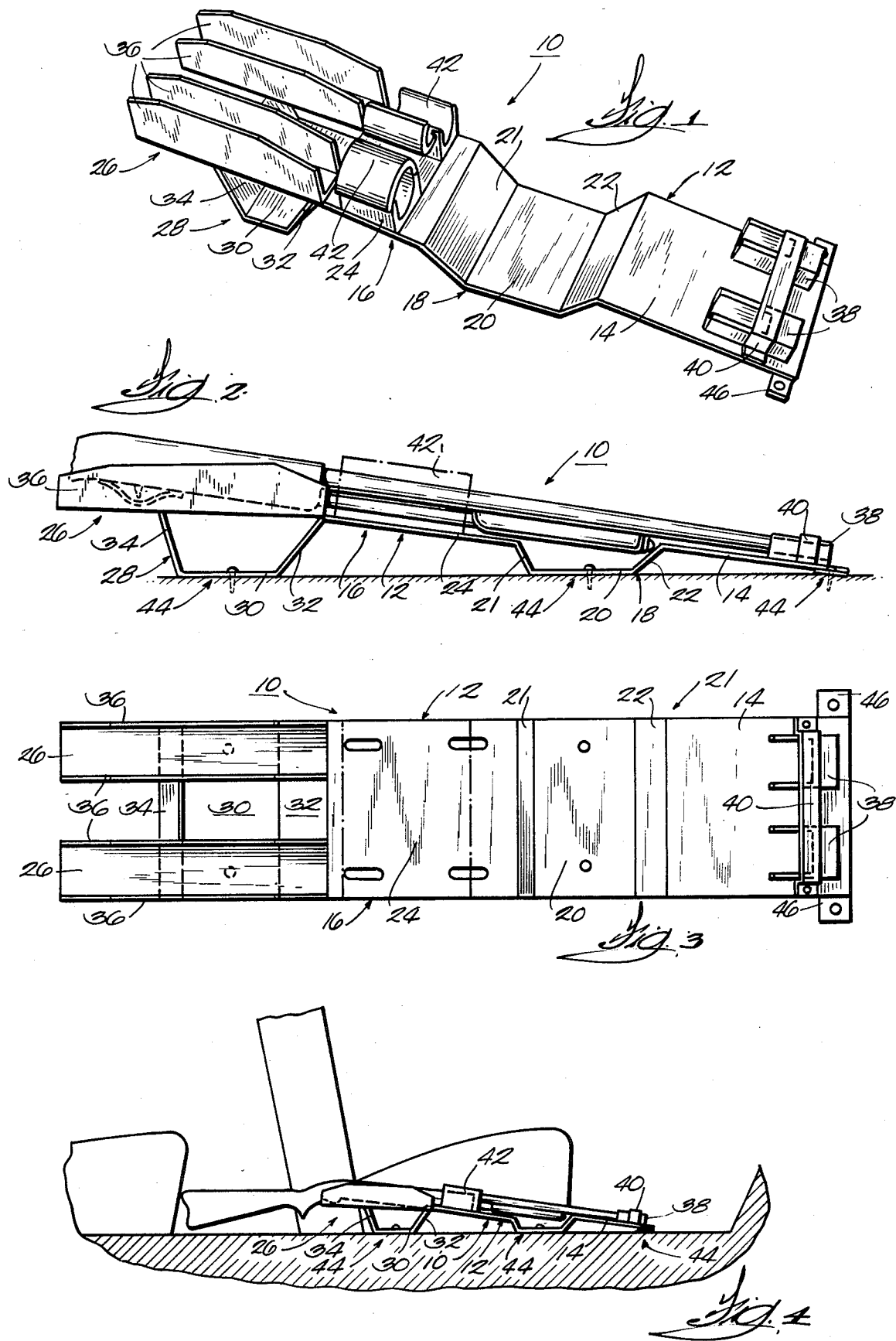

1

GUN RACK

BACKGROUND OF THE INVENTION

The invention relates to gun racks and, more particularly, to gun racks adapted to be mounted in vehicles, especially police cars.

Many gun racks have been designed for supporting a gun, usually a shotgun, in the front passenger compartment of a police car or other vehicle. Such gun racks that are known by the inventor either support a gun vertically so that a portion of the gun extends above the dashboard of the car, or semi-horizontally so that a portion of the gun extends above the front seat of the car. No known gun rack supports a gun in a substantially horizontal position along the floor of the car.

Many known gun racks do not prevent firing of a gun in a gun rack, i.e., they do not prevent access to the trigger of the gun. Also, many known gun racks do not prevent disassembly of a gun in the gun rack. It is often possible, in the case of commonly used police shotguns, to remove the magazine cap of the gun and thereby to disassemble the gun and remove the gun from the gun rack.

Attention is directed to the following U.S. Patents:
McCue U.S. Pat. No. 4,364,499, issued Dec. 21, 1982;
Young U.S. Pat. No. 4,132,315, issued Jan. 2, 1979;
Walters U.S. Pat. No. 3,917,071, issued Nov. 4, 1975;
Sikes U.S. Pat. No. 3,767,094, issued Oct. 23, 1973;
Howerton U.S. Pat. No. 3,643,811, issued Feb. 22, 1972;
Sjostrand U.S. Pat. No. 3,497,077, issued Feb. 24, 1970;
Porter U.S. Pat. No. 3,473,673, issued Oct. 21, 1969;
Pinkerton et al. U.S. Pat. No. 3,326,385, issued June 20, 1967;
Caloiero et al. U.S. Pat. No. 2,958,422, issued Nov. 1, 1960;
Johnson et al. U.S. Pat. No. 2,775,351, issued Dec. 25, 1956;
Levy U.S. Pat. No. 2,752,046, issued June 26, 1956;
Vermillion U.S. Pat. No. 2,710,100, issued June 7, 1955;
Winters et al. U.S. Pat. No. 2,692,069, issued Oct. 19, 1955;
Levy U.S. Pat. No. 2,623,639, issued Dec. 30, 1952;
Levy U.S. Pat. No. 2,616,566, issued Nov. 4, 1952.

SUMMARY OF THE INVENTION

The invention provides a gun rack adapted to be mounted in a vehicle having a rear seat, a floor, and spaced apart front seats, the gun rack being adapted to hold a weapon, preferably a shotgun, having a barrel and a stock. The gun rack comprises a base portion adapted to have the shotgun fixedly secured thereto, and means for mounting the base portion on the floor of the vehicle such that, when the gun is secured to the base portion, the gun is held in a generally horizontal position along the floor of the vehicle with the stock extending rearwardly of the front seats and with the barrel extending forwardly of the front seats.

Preferably, the base portion comprises an elongated metal plate including a generally planar front portion adapted to support the muzzle of the weapon, a generally planar rear portion adapted to support the trigger guard of the gun, the rear portion being generally coplanar with the front portion, and a recessed portion between the front and rear portions. The recessed portion is adapted to house at least a portion of the forearm of the gun and includes a removal restricting surface extending transversely to the planar front portion and facing the rear portion. The function of the removal restricting surface is explained below.

Preferably, the gun also has a magazine cap, a trigger guard, a forearm, and a muzzle, and the base portion includes opposite front and rear ends and a longitudinal axis. In the preferred embodiment, the gun rack further comprises means for preventing removal of the magazine cap when the gun is secured to the support surface, the means including the removal restricting surface, and means for securing the gun to the base portion. The securing means is preferably selectively operable between open and closed positions such that, with the securing means in the open position, the gun is insertable into the gun rack with the magazine cap being closely adjacent the restricting surface, and such that, with the securing means in the closed position, the restricting surface prevents removal of the magazine cap and disassembly of the gun, and the securing means prevents vertical, sideways, and axial movement of the gun.

In the preferred embodiment, the vehicle has an ignition switch, and the means for securing includes a gun lock, the gun lock being electrically operated and adapted to be connected in an electrical circuit with the ignition switch such that the gun lock can be operated only when the ignition switch is closed.

Preferably, the gun rack further comprises a pair of trigger guard plates extending from the rear portion and being spaced apart in a direction transverse to the longitudinal axis of the base portion, the trigger guard plates being adapted to be positioned on opposite sides of the trigger of the gun in order to prevent access to the trigger.

Also, in the preferred embodiment, the gun rack further comprises a muzzle guard adjacent the front end of the front portion and adapted to house the muzzle of the gun in order to prevent vertical movement of the muzzle.

A principal feature of the invention is the provision of a gun rack adapted to be mounted in a vehicle having spaced apart front seats such that the gun is held in a generally horizontal position along the floor of the vehicle between the front seats with the stock of the gun extending rearwardly of the front seats and with the barrel of the gun extending forwardly of the front seats.

Another principal feature of the invention is the provision of means for preventing removal of the magazine cap of the gun when the gun is secured to the rack. This prevents disassembly of the gun in the gun rack by removing the magazine cap of the gun.

Another principal feature of the invention is the provision of trigger guard plates positioned on opposite sides of the trigger of the gun in order to prevent access to the trigger.

Another principal feature of the invention is the provision of an electric gun lock connected in circuit with the ignition switch of the vehicle such that the gun lock can be operated only when the ignition switch is closed.

Because of these features, the gun rack of the invention is particularly suited for use in a police car, and especially for use in a police car having spaced apart front seats, or bucket seats. In such a police car, the gun rack can be mounted on the floor of the car between the front seats so that guns mounted in the gun rack are barely visible from outside the car. Furthermore, guns in the gun rack can be completely hidden by placing a simple fabric cover, preferably matching the interior of the car, over the guns. This mounting of the guns provides additional advantages in that the guns do not obstruct movement of passengers within the car and, unlike in the case of vertically mounted guns, the guns do not obstruct the view of the passengers and are not in a position to be struck by passengers in the event of an accident.

The gun rack of the invention is also particularly suited for use in police cars because the trigger guard plates prevent discharge of a gun in the gun rack. This is important since police cars are often used to transport criminals.

Another principal feature of the invention is that the base of the gun rack is very easy to construct. Almost all of the base is made from a single stamped metal plate.

Other features and advantages of the invention will become apparent to those skilled in the art upon review of the following detailed description, claims and drawings.

DESCRIPTION OF THE DRAWINGS

FIG. 1 is a perspective view of a gun rack embodying the invention.

FIG. 2 is a side view of the gun rack, shown with a gun supported therein.

FIG. 3 is a top view of the gun rack of FIG. 1, without the gun locks.

FIG. 4 is a side view of the gun rack mounted in a vehicle.

Before explaining one embodiment of the invention in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Illustrated in the drawings is a gun rack 10 embodying the invention. The gun rack 10 of the preferred embodiment is constructed so as to support two guns, preferably shotguns. The gun rack 10 includes a base 12, which includes a generally planar front portion 14, a generally planar rear portion 16, the rear portion 16 being generally parallel to the front portion 14, and a recessed portion 18 integrally connecting the front and rear portions 14 and 16. The recessed portion 18 includes a lower plate 20 offset from the front and rear portions 14 and 16, a connecting member 21, and a removal restricting member including a removal restricting surface 22 integrally connecting the lower plate 20 and the front portion 14 of the base 12. The function of the removal restricting surface 22 will be explained later.

The rear portion 16 is generally U-shaped, as best shown in FIG. 3, and comprises a main portion 24 integrally connected to the recessed portion 18, and two legs 26 extending rearwardly from the main portion 24. In the preferred construction, as best shown in FIG. 2, the rear portion 16 is not exactly planar, as the main portion 24 and legs 26 form a slight angle with respect to each other.

The base 12 further includes a support portion 28 which supports the rear portion 16 and which includes a bottom plate 30 that is generally coplanar with the lower plate 20 of the recessed portion 18 and is substantially parallel to and positioned beneath the legs 26 of the rear portion 16. The support portion 28 also includes a pair of support legs 32 and 34 extending generally upwardly from the bottom plate 30 to support the rear portion 16, the first leg 32 connecting the front end of the bottom plate 30 to the rear end of the main portion 24, and the second leg 34 connecting the rear end of the bottom plate 30 to the legs 26 of the rear portion 16.

In the preferred embodiment, the gun rack 10 also includes two pairs of trigger guard plates 36 extending upwardly from the opposite edges of the legs 26 of the rear portion 16. In the preferred construction, each pair of trigger guard plates 36 and the connected leg 26 of the rear portion 16 are formed from an integral elongated metal piece that is U-shaped in cross-section.

A major advantage of the gun rack 10 is that it is very easily constructed. Preferably, the front portion 14, the recessed portion 18, the main portion 24, and the support portion 28 are all formed from a single stamped metal plate. The main structure of the gun rack 10 is completed by attaching the legs 26 of the rear portion and the trigger guard plates 36, which are formed from U-shaped elongated metal pieces, as described above.

Preferably, the gun rack 10 also includes a pair of muzzle guards 38 fixedly attached to the front end of the front portion 14. In the illustrated construction, the muzzle guards 38 are secured to the front portion 14 by a strap-like member 40. Each muzzle guard 38 houses the muzzle of a gun and prevents movement of the muzzle away from the front portion 14 of the base 12.

In the preferred embodiment, the gun rack 10 further includes means for securing the guns to the base 12. Preferably, this means includes a pair of gun locks 42 mounted on the main portion 24. Each gun lock 24 includes a hinged cover movable between an open position and a closed position (see FIG. 1). As is typical, the gun lock 42 includes locking means for securely holding the hinged cover in the closed position whereby the gun lock 42 surrounds a portion of the gun, as shown in FIG. 2, and substantially prevents axial, sideways, and vertical movement of the gun. Preferably, the locking means of the gun lock 42 is electrically actuated and is connected in an electrical circuit with the ignition switch of the vehicle so that the gun lock 42 can be operated only when the ignition switch is closed. Such gun locks are commercially available, and one such gun lock is available from Smith & Wesson Chemical Co., Inc., Rock Creek, Ohio.

In the preferred embodiment, the gun rack 10 further includes means for preventing removal of the magazine cap of the gun when the gun is secured to the base 12. Preventing removal of the magazine cap prevents disassembly of the gun while it is locked in the gun rack 10. Preferably, the means for preventing removal of the magazine cap comprises the removal restricting surface 22 described above. As will be explained later, when a gun is inserted into the gun rack 10, the magazine cap of the gun is positioned closely adjacent the removal restricting surface 22 so that removal of the magazine cap is prevented.

The gun rack 10 also preferably includes means for mounting the base 12 on the floor of a vehicle having spaced apart front seats such that when the gun is secured to the base 12, the gun is held in a generally horizontal position along the floor of the vehicle between the front seats with the stock of the gun extending rearwardly of the front seats and with the barrel of the gun extending forwardly of the front seats. In the illustrated construction, this means for mounting includes connecting means 44 on each of the bottom plate 30 of the support portion 28, the lower plate 20 of the recessed portion 18, and the front end of the front portion 14, as best shown in FIG. 2. The connecting means 44 on the bottom plate 30 includes a pair of holes (see FIG. 3) in the bottom plate 30, and bolts extending through the holes and adapted to secure the bottom plate 30 to the floor of the vehicle. The connecting means 44 on the lower plate 20 of the recessed portion 18 includes similar holes (see FIG. 3) and bolts. The connecting means 44 on the front end of the front portion 14 includes a pair of tabs 46 (see FIGS. 1 and 3) extending outwardly from the opposite sides of the front portion 14, each of the tabs 46 having a hole therethrough, and bolts extending through the holes and adapted to secure the tabs 46 to the floor of the vehicle.

A gun is supported by the gun rack 10 as follows. The gun is inserted into the gun rack 10 so that the muzzle is housed by a muzzle guard 38, the trigger guard is supported by a leg 26 of the rear portion 16 and is surrounded by a pair of trigger guard plates 36, a portion of the gun is housed in a gun lock 42, and the forearm is at least partially received in the recessed portion 18, with the magazine cap being closely adjacent the removal restricting surface 22. The stock of the gun extends rearwardly of the rear portion 16. The gun lock 42, when locked, prevents axial, sideways, and vertical movement of the gun as explained above. At the same time, the trigger guard plates 36 prevent access to the trigger, the removal restricting surface 22 prevents removal of the magazine cap and subsequent disassembly of the gun, and the muzzle guard 38 prevents vertical movement of the muzzle. Thus, the gun is secured in the gun rack 10 in a manner such that it is practically impossible to discharge, disassemble, or remove the gun.

In FIG. 4, the gun rack 10 is shown mounted in the preferred position in a vehicle between spaced apart front seats. The gun rack 10 is secured to the floor of the vehicle as explained above. In this position, the stock of the gun extends rearwardly of the front seat so that the butt is closely adjacent the rear seat, and the barrel of the gun extends forwardly of the front seat. However, the barrel does not extend so far forwardly that it interferes with communication equipment positioned beneath the dashboard on the transmission hump. In this position, the gun is substantially below the level of the seat portion of the front seat, and is therefore barely visible from outside the vehicle. Furthermore, by placing a simple fabric cover over the gun in the gun rack 10, the gun can be completely hidden from view. Also, in this position, the gun does not obstruct movement of passengers or the view of passengers, and the gun is not in a position to be struck by passengers in the event of an accident.

Various features of the invention are set forth in the following claims:

1. A gun rack for holding a weapon having a trigger, a trigger guard, a forearm, a magazine cap on the forearm, and a muzzle spaced forwardly of the magazine cap, the gun rack comprising an elongated base having a longitudinal axis and being made of an elongated metal plate including a generally planar front portion adapted to support the muzzle of the weapon, a generally planar rear portion adapted to support the trigger guard of the weapon, said rear portion being generally coplanar with said front portion, and a recessed portion integrally connecting said front portion and said rear portion, said recessed portion being adapted to house at least a portion of the forearm of the weapon and including a removal restricting surface extending transversely to said planar front portion and facing said rear portion, a muzzle guard spaced forwardly of said restricting surface and fixedly attached to said front portion, said muzzle guard forming an opening adapted to receive and house the muzzle of the weapon, a pair of trigger guard plates extending upwardly from said rear portion and being spaced apart in a direction transverse to the longitudinal axis of said base, and means for selectively securing the weapon to said base, said securing means being selectively operable between open and closed positions such that, with said securing means in said open position, the weapon is insertable into said gun rack with the muzzle being housed in said muzzle guard, with the forearm being housed in said recessed portion with the magazine cap closely adjacent said restricting surface, and with the trigger between the trigger plates, and such that, with said securing means in said closed position, said restricting surface prevents removal of the magazine cap and disassembly of the weapon, said securing means prevents longitudinal movement of the weapon, said muzzle guard and said securing means prevent movement of the weapon away from said base, and said trigger guard plates prevent access to the trigger.

2. A gun rack as set forth in claim 1 and adapted to be mounted in a vehicle having a rear seat, a floor, and spaced apart front seats, wherein the weapon also has a barrel and a stock, and wherein the gun rack further comprises means including said recessed portion, and a support portion depending from said rear portion and being spaced from said recessed portion, for mounting said base on the floor of the vehicle such that, when the weapon is secured to said base, the weapon is held in a generally horizontal position along the floor of the vehicle between the front seats with the stock extending rearwardly of the front seats, and with the barrel extending forwardly of the front seats.

3. A gun rack as set forth in claim 2 wherein the vehicle has an ignition switch, and wherein said means for securing the weapon includes a gun lock, said gun lock being electrically operated and connected in circuit with the ignition switch that said gun lock can be operated only when the ignition switch is closed.

* * * * *